US012590735B2

(12) United States Patent
Joshi et al.

(10) Patent No.: US 12,590,735 B2
(45) Date of Patent: Mar. 31, 2026

(54) PASSIVE THERMAL REGULATION SYSTEM AND DEVICES THEREOF

(71) Applicants: Toyota Motor Engineering & Manufacturing North America, Inc., Plano, TX (US); The Board of Trustees of the University of Illinois, Urbana, IL (US)

(72) Inventors: Shailesh N. Joshi, Ann Arbor, MI (US); Dajie Xie, Champaign, IL (US); Paul V. Braun, Champaign, IL (US)

(73) Assignees: Toyota Motor Engineering & Manufacturing North America, Inc., Plano, TX (US); The Board of Trustees of the University of Illinois, Urbana, IL (US)

( * ) Notice: Subject to any disclaimer, the term of this patent is extended or adjusted under 35 U.S.C. 154(b) by 597 days.

(21) Appl. No.: 17/589,045

(22) Filed: Jan. 31, 2022

(65) Prior Publication Data

US 2023/0243555 A1     Aug. 3, 2023

(51) Int. Cl.
*F24S 70/225* (2018.01)
*C09D 5/26* (2006.01)
(Continued)

(52) U.S. Cl.
CPC .............. *F24S 70/225* (2018.05); *C09D 5/26* (2013.01); *C09D 5/32* (2013.01); *F24S 80/52* (2018.05); *F24S 2080/013* (2018.05)

(58) Field of Classification Search
CPC ....... C09D 5/26; C09D 5/32; F24S 2080/013; F24S 2080/014; F24S 40/52; F24S 70/225; F24S 80/52
See application file for complete search history.

(56) References Cited

U.S. PATENT DOCUMENTS 3,174,537 A * 3/1965 Meyer ...................... B64G 1/50
                                                      244/117 A
5,615,040 A * 3/1997 Watanabe ......... B32B 17/10568
                                                      349/182
(Continued)

FOREIGN PATENT DOCUMENTS

CN        100515498 C     7/2009
CN        103554356 B     3/2016
(Continued)

OTHER PUBLICATIONS

Fang, et. al; "Thermal Homeostasis Enabled by Dynamically Regulating the Passive Radiative Cooling and Solar Heating Based on a Thermochromic Hydrogel"; ACS Photonics 2021, 8, 2781-2790 (Year: 2021).*

*Primary Examiner* — Michael G Hoang
*Assistant Examiner* — Logan P Jones
(74) *Attorney, Agent, or Firm* — Dinsmore & Shohl LLP

(57) ABSTRACT

A passive thermal regulation system includes a substrate and a coating. The coating is positioned to encapsulate at least a portion of the substrate. The coating includes a first hydrogel layer and a second hydrogel layer. The first hydrogel layer has a plurality of carbon materials configured to absorb a solar radiation. The second hydrogel layer includes a hydrogel that is different from the first hydrogel layer. The coating, at a first temperature, causes the passive thermal regulation system to passively switch from a solar reflective state to solar absorber state to permit the plurality of carbon materials to absorb the solar radiation. At a second temperature, the coating causes the system to passively switch from the solar absorber state to the solar reflective state where the hydrogel of the second hydrogel layer inhibits the solar radiation from absorption. The second temperature is greater than the first temperature.

16 Claims, 5 Drawing Sheets

(51) Int. Cl.
| | |
|---|---|
| *C09D 5/32* | (2006.01) |
| *F24S 40/52* | (2018.01) |
| *F24S 80/00* | (2018.01) |
| *F24S 80/52* | (2018.01) |

(56) References Cited

U.S. PATENT DOCUMENTS

| | | | |
|---|---|---|---|
| 9,421,164 B2 | 8/2016 | Chung et al. | |
| 10,726,981 B2 | 7/2020 | Hesampour et al. | |
| 2018/0004018 A1* | 1/2018 | Oron | E06B 3/6722 |
| 2019/0040520 A1* | 2/2019 | Krammer | F24S 70/30 |
| 2019/0194515 A1* | 6/2019 | Van Dessel | C08F 220/44 |
| 2020/0087485 A1 | 3/2020 | Nonoyama et al. | |

FOREIGN PATENT DOCUMENTS

| | | | | |
|---|---|---|---|---|
| CN | 109971001 A | | 7/2019 | |
| CN | 110183714 A | * | 8/2019 | |
| DE | 102015015877 A1 | * | 6/2017 | E06B 3/6722 |
| KR | 102189902 B1 | * | 12/2020 | |
| WO | WO-2010043663 A1 | * | 4/2010 | C09K 11/7421 |
| WO | WO-2010134071 A1 | * | 11/2010 | G02F 1/0147 |

* cited by examiner

500

MIR Enmissivity

PASSIVE THERMAL REGULATION SYSTEM AND DEVICES THEREOF

TECHNICAL FIELD

The present specification generally relates to thermal regulation, and more particularly, to passively and automatically changing a visible and infrared properties at different temperatures to switch between heating and cooling states for a black body device.

BACKGROUND

Passive radiative cooling is known for improving energy efficiencies by providing a path to dissipate heat from a structure into an atmosphere. Further, it is known to use nocturnal radiative cooling via pigmented paints, dielectric coating layers, metallized polymer films, and organic gases because of their intrinsic thermal emission properties. Additionally, daytime radiative cooling is known by absorbing visible wavelengths, though nanostructures or hybrid optical metamaterials. However, these are static radiative cooling layers and are not automatically switchable between heating and cooling system at different temperatures.

SUMMARY

In one embodiment, a passive thermal regulation system is provided. The passive thermal regulation system includes a substrate and a coating. The coating is positioned to encapsulate at least a portion of the substrate. The coating includes a first hydrogel layer and a second hydrogel layer. The first hydrogel layer has a plurality of carbon materials configured to absorb a solar radiation. The second hydrogel layer includes a hydrogel that is different from the first hydrogel layer. The coating, at a first temperature, causes the passive thermal regulation system to passively switch from a solar reflective state to solar absorber state to permit the plurality of carbon materials to absorb the solar radiation. At a second temperature, the coating causes the passive thermal regulation system to passively switch from the solar absorber state to the solar reflective state where the hydrogel of the second hydrogel layer inhibits the solar radiation from absorption. The second temperature is greater than the first temperature.

In another embodiment, a passive heating and cooling device is provided. The passive heating and cooling device includes a substrate and a coating. The coating positioned to encapsulate at least a portion of the substrate. The coating includes a first layer, a first hydrogel layer, and a second hydrogel layer. The first layer is disposed on the substrate. The first hydrogel layer has a plurality of carbon materials configured to absorb a solar radiation. The second hydrogel layer includes a thermochromic PNIPAM hydrogel. The coating, at a first temperature, causes the passive heating and cooling device to passively switch from a solar reflective state to solar absorber state to permit the plurality of carbon materials to absorb the solar radiation. The coating, at a second temperature, causes the passive heating and cooling device to passively switch from the solar absorber state to the solar reflective state where the thermochromic PNIPAM hydrogel of the second hydrogel layer inhibits the solar radiation from absorption. The second temperature being greater than the first temperature.

In another embodiment, a passive thermal regulation system is provided. The passive thermal regulation system includes a substrate and a coating. The coating is positioned to encapsulate at least a portion of the substrate. The coating includes a porous layer, a first hydrogel layer, and a second hydrogel layer. The porous layer includes a plurality of porous materials configured to act as a liquid reservoir for holding a liquid. The first hydrogel layer includes a plurality of carbon materials configured to absorb a solar radiation. The second hydrogel layer includes a thermochromic PNIPAM hydrogel. The coating, at a first temperature, causes the passive thermal regulation system to passively switch from a solar reflective state to solar absorber state to permit the plurality of carbon materials to absorb the solar radiation and where the second hydrogel layer will absorb the liquid held within the plurality of porous materials of the porous layer. At a second temperature, the coating causes the passive thermal regulation system to passively switch from the solar absorber state to the solar reflective state where the hydrogel of the second hydrogel layer inhibits the solar radiation from absorption the second hydrogel layer releases the liquid to be collected by the plurality of porous materials of the porous layer. The second temperature being greater than the first temperature.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are directed to a passive thermal regulation system that can automatically switch between heating and cooling system at different temperatures. The different temperatures may depend on the time of day (e.g., daytime versus nighttime). The system may include a device, such as a sun absorber, that includes a substrate and a coating. As a non-limiting example, the coating is configured to switch between a solar reflective state when a temperature of the device is above a predetermined threshold, and a solar absorber state when the temperature of the device is below the predetermined threshold. In the solar reflective state, the coating has increased radiative cooling to deflect solar radiation such that daytime radiative cooling is achievable. In the solar absorber state, the switchable coating becomes transparent such that solar radiation is absorbed by the device to heat up the system.

In some embodiments, the coating may include a porous layer disposed on the substrate, a first hydrogel layer, a second hydrogel layer, and a cover positioned on top of the second hydrogel layer. The porous layer, first hydrogel layer, second hydrogel layer, and cover are arranged in a vertically stacked arrangement. The porous layer includes a plurality of porous materials configured to act as a fluid reservoir when the coating is in the solar reflective state and a fluid source when the coating is in the solar absorber state. The first hydrogel layer includes a plurality of carbon materials configured to absorb a solar radiation in the solar absorber state. The plurality of carbon materials permit the coating to solar radiation (visible near infrared) at lower temperatures. The second hydrogel layer includes a thermochromic PNIPAM hydrogel, which is different from the first hydrogel layer. The thermochromic PNIPAM hydrogel has a reversible phase transition at a Lower Critical Solution Temperature that changes visible and/or near infrared reflectivity.

In the solar reflective state, the second hydrogel layer will absorb a fluid held within the plurality of porous materials of the porous layer. In the solar absorber state, the second hydrogel layer releases the liquid that is collected by the plurality of porous materials of the porous layer. The vertically stacked arrangement prevents the liquid retained by the porous layer from evaporating.

Various embodiments of the passive thermal regulation system to passively and automatically switch modes of heating and cooling the device are described in detail herein.

Figure 1A:
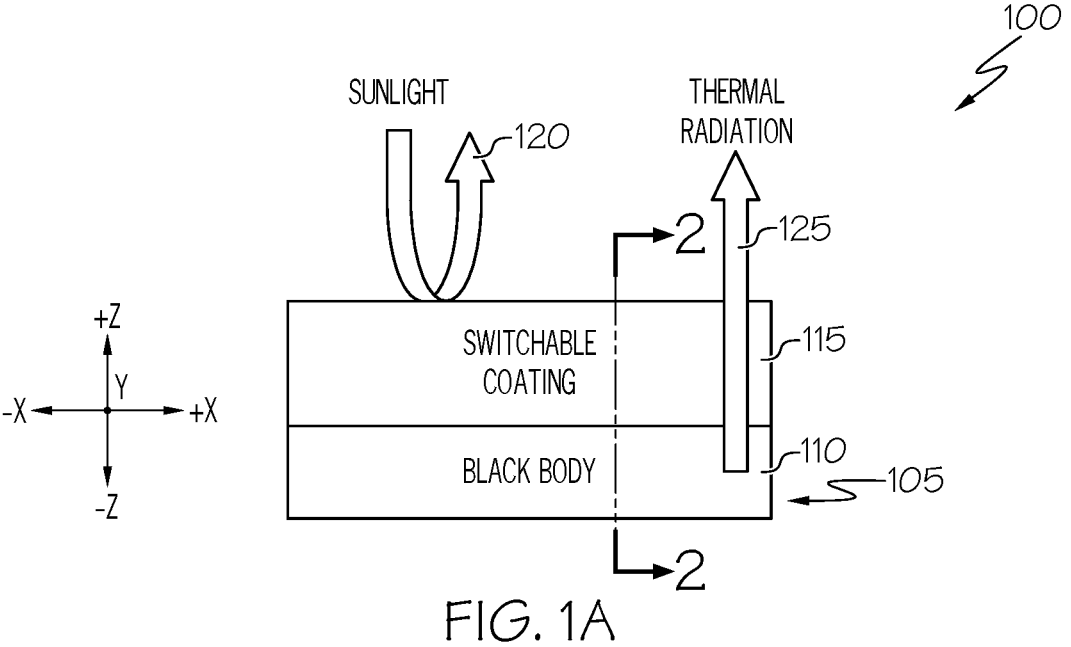
FIG. 1A schematically depicts an example passive thermal regulation system in a solar reflective state according to one or more embodiments shown and described herein.

As used herein, the term "device lateral direction" refers to the forward-rearward direction of the device (i.e., in a +/−Y direction of the coordinate axes depicted in FIG. 1A). The term "device longitudinal direction" refers to the cross-direction of the device (i.e., along the X axis of the coordinate axes depicted in FIG. 1A), and is transverse to the lateral direction. The term "device vertical direction" refers to the upward-downward direction of the device (i.e., in the +/−Z direction of the coordinate axes depicted in FIG. 1A). As used herein, "upper" is defined as generally being towards the positive Z direction of the coordinate axes shown in the drawings. "Lower" or "below" is defined as generally being towards the negative Z direction of the coordinate axes shown in the drawings.

Referring now to FIGS. 1A-3B, an example passive thermal regulation system 100 is schematically illustrated. The example passive thermal regulation system 100 includes an example device 105 that includes a substrate 110 and a coating 115 that encapsulates a least a portion of the substrate 110. In some embodiments, the device 105 is a black body. As such, it should be understood that the black body absorbs all radiant energy that is falling or applied to it. For example, the black body may be a sun absorber that absorbs radiative energy from the sun. As such, the black body may have an absorptivity of unity in a solar irradiance wavelength region (e.g., 0.3-2.5 μm), and minimal infrared thermal emissivity to depress spontaneous blackbody irradiation (e.g., 2.5-25 μm).

That is, the black body may be highly reflective in visible near infrared region and highly emissive in atmosphere window region during a daytime radiative window to realize sub-ambient temperature cooling. However, known black body systems are static and are not favorable for different seasons. Moreover, known black body devices that may incorporate switchable daytime radiative cooling/heating system properties require external manual stimuli to switch states. As such, these are not passive systems.

The example passive thermal regulation system 100 described herein includes the coating 115 that passively and automatically switches between a heating system and a cooling system based on a temperature of the device 105. The different temperatures may depend on the time of day (e.g., daytime versus nighttime or different seasons) when the temperature of the device 105 changes as a result of the amount of solar radiation energy. The coating 115 is configured to switch between a solar reflective state when a temperature of the device 105 is above a predetermined threshold, and a solar absorber state when the temperature of the device 105 is below the predetermined threshold, as discussed in greater detail herein.

In the solar reflective state, the coating 115 has increased radiative cooling to deflect solar radiation such that daytime radiative cooling is achievable. In the solar absorber state, the coating 115 becomes transparent such that solar radiation is absorbed by the device 105 to heat up the example passive thermal regulation system 100. As such, the example passive thermal regulation system improves upon the already known black body devices and/or known switching systems, as discussed above.

Figure 1B:
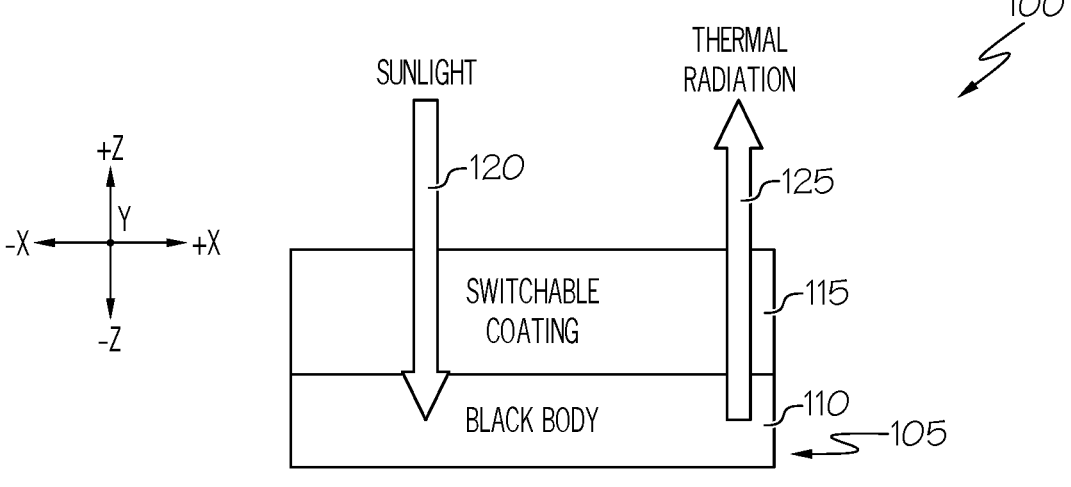
FIG. 1B schematically depicts the example passive thermal regulation system of FIG. 1A in a solar absorber state according to one or more embodiments shown and described herein.

Referring to FIGS. 1A and 1B, the example passive thermal regulation system 100 overview is schematically depicted. FIG. 1A is directed to the example passive thermal regulation system 100 in the solar reflective state. That is, the coating 115 has switched into the solar reflective state to increase radiative cooling to deflect solar radiation, depicted by arrow 120 and the coating 115 allow for thermal radiation, depicted by arrow 125, to escape from the device 105. As such, the temperature of the device 105 may be maintained less than the temperature of the solar radiation applied to the device 105. As such, daytime radiative cooling is achievable. That is, the temperature of the device 105 may be passively regulated based on a temperature of the device 105.

FIG. 1B schematically depicts the example passive thermal regulation system 100 in the solar absorber state. The solar absorber state occurs when the temperature of the device 105 is below the predetermined threshold. As such, in the solar absorber state, the switchable coating becomes transparent such that the solar radiation, depicted by arrow 120, is absorbed by the device 105 to heat up the example passive thermal regulation system 100, while the coating 115 allows for thermal radiation, depicted by the arrow 125, to escape from the device 105. That is, when the temperature of the device 105 is below the predetermined threshold, such as at night, and/or during fall, winter or spring seasons when solar radiation is not as abundant as during the daytime or summer season, respectively, the coating 115 passively has switched into the solar absorber state to allow for absorption of solar radiation to generate or provide energy to the device 105. As such, nighttime radiative heating is achievable.

Figure 2:
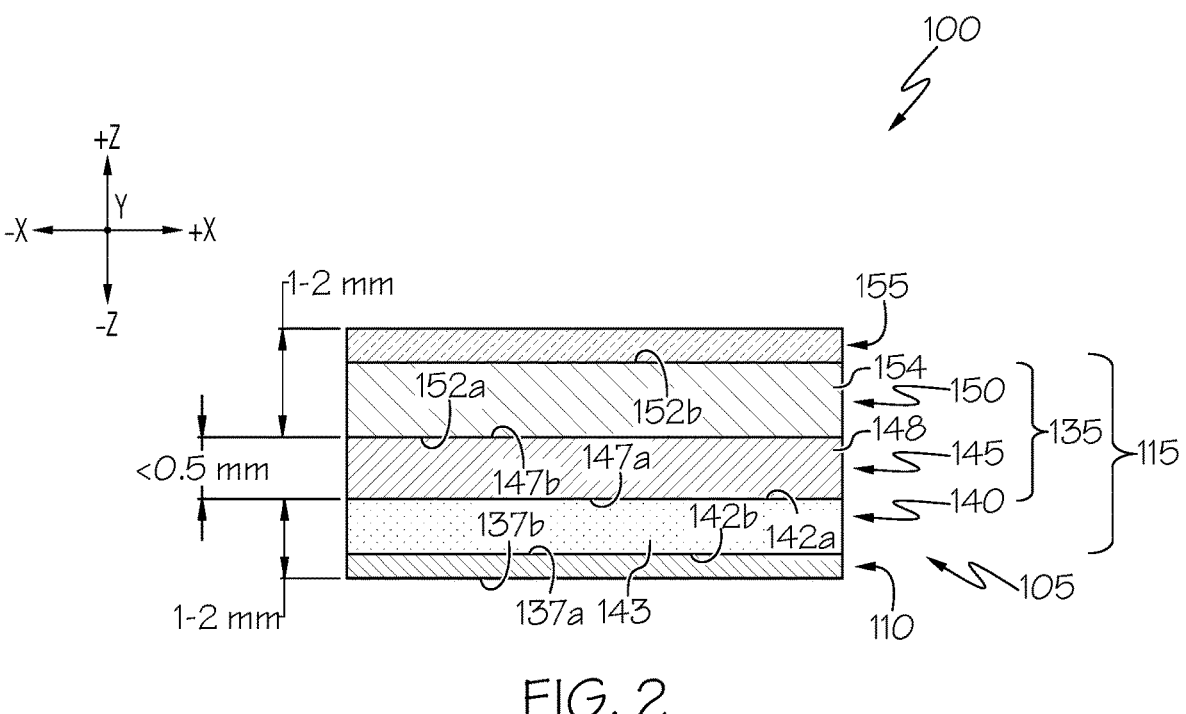
FIG. 2 schematically depicts a cross section view of a device of the example passive thermal regulation system of FIG. 1A taken from line 2-2 according to one or more embodiments shown and described herein.
Figure 3A:
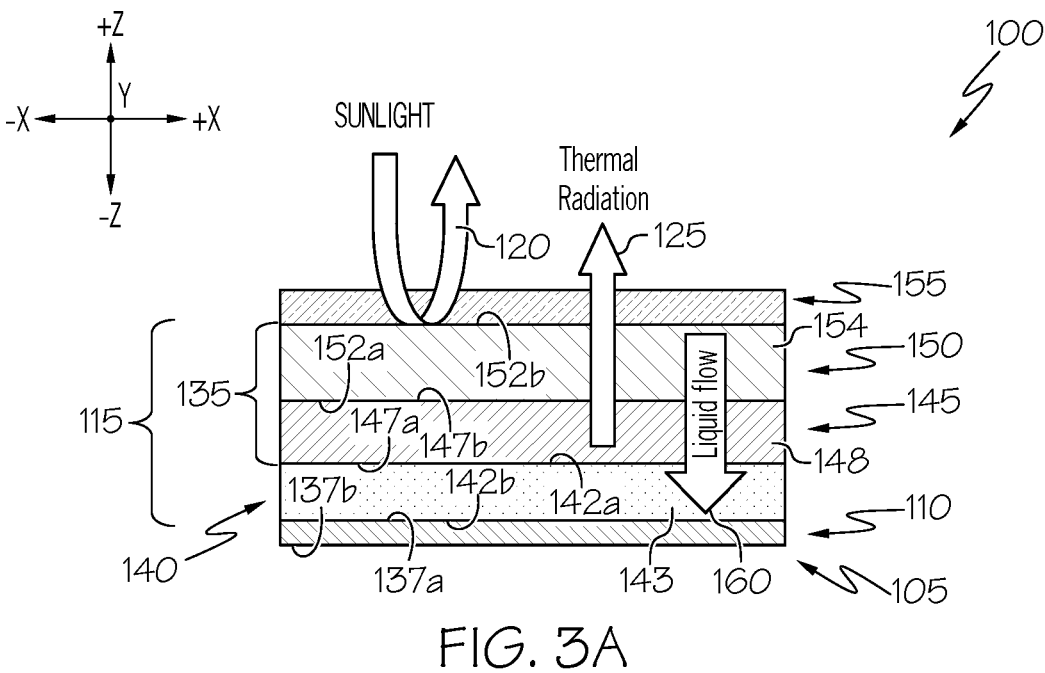
FIG. 3A schematically depicts the cross sectional view of FIG. 2 with the example passive thermal regulation system in the solar reflective state according to one or more embodiments shown and described herein.
Figure 3B:
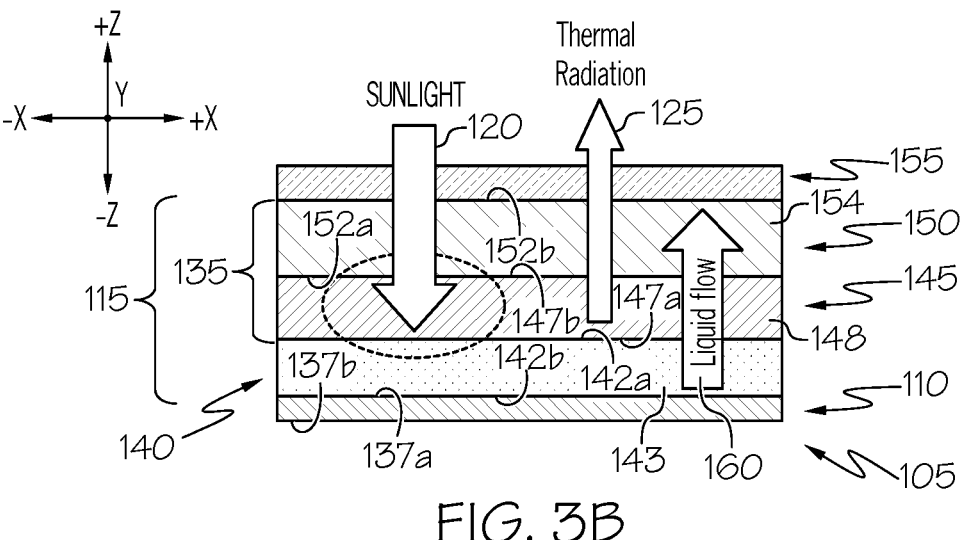
FIG. 3B schematically depicts the cross sectional view of FIG. 2 with the example passive thermal regulation system of FIG. 1A in the solar absorber state according to one or more embodiments shown and described herein.

Now referring to FIGS. 2 and 3A-3B, the device 105 is schematically depicted in a cross section view. The device 105 may include the substrate 110, the coating 115, and a cover 155. The substrate 110 includes an upper surface 137a and an opposite lower surface 137b. The coating may be positioned above the upper surface 137a in the device vertical direction (i.e., in the +/−Z direction). As such, portions of the coating 115 may be in contact with the upper surface 137a of the substrate 110.

The substrate 110 may be any component. As discussed herein the substrate 110 may be a black body formed from composite metamaterials. For example, the substrate may be formed from carbon aerogel material, polydimethylsiloxane (PDMS) material, and/or the like. Further, the substrate 110 may be formed from three-dimensional printing techniques. It should be understood that although the substrate 110 is referred to as a black body in the present example, in some embodiments, other types of substrates are contemplated. For example, a gray body that partially absorbs incident radiation.

The coating 115 may be bonded or adhered to the upper surface 137a of the substrate 110. The coating may generally comprise a hydrogel system 135 and a porous layer 140 disposed on the upper surface 137a of the substrate 110.

The hydrogel system 135 includes a first hydrogel layer 145 and a second hydrogel layer 150. The hydrogel system 135 is positioned between the cover 155 and the porous layer 140. As such, the cover 155 is positioned to be above the hydrogel system 135 in the device vertical direction (i.e., in the +/Z direction) and the substrate 110 and the porous layer 140 are positioned to be below the hydrogel system 135 in the device vertical direction (i.e., in the +/Z direction). In particular, as discussed in greater detail herein, the cover 155 is positioned to be in contact with the second hydrogel layer 150 and the porous layer 140 is positioned to be in contact with the first hydrogel layer 145.

As such, the porous layer 140, first hydrogel layer 145, second hydrogel layer 150, and cover 155 are arranged in a vertically stacked arrangement in the device vertical direction (i.e., in the +/Z direction) such that the cover 155 and the substrate 110 sandwich the porous layer 140, the first hydrogel layer 145, and the second hydrogel layer 150.

Still referring to FIGS. 2 and 3A-3B, the porous layer 140 includes an outer-face 142a and an opposite interface 142b. The outer-face 142a is spaced apart from the interface 142b to define a thickness. The interface 142b is in contact with the upper surface 137a of the substrate 110. A plurality of porous materials 143, such as sponge materials, are positioned between the outer-face 142a and the interface 142b. The plurality of porous materials 143 are configured to act as a liquid reservoir when the coating 115 is in the solar reflective state, as best illustrated in FIG. 3A, and a fluid source when the coating 115 is in the solar absorber state, as best illustrated in FIG. 3B. As such, the porous layer 140 may be a sponge layer.

The first hydrogel layer 145 is a layer of hydrogel that includes an inner surface 147a and an opposite outer surface 147b. The outer surface 147b is spaced apart from the inner surface 147a to define a thickness. The inner surface 147a is in contact with the outer-face 142a of the porous layer 140. A plurality of carbon materials 148 are positioned within the thickness of the first hydrogel layer 145 between the outer surface 147b and the inner surface 147a.

The plurality of carbon materials 148 are configured to absorb the solar radiation, as illustrated by arrow 120, which is derived from outside of the device 105. The plurality of carbon materials 148 assist in passively changing the coating 115 into a transparent coating to absorb the solar radiation. As such, when the coating 115 is in the solar absorber state, as best illustrated in FIG. 3B, the plurality of carbon materials 148 absorb the solar radiation to heat the device 105. That is, the plurality of carbon materials 148 permit the coating 115 to absorb solar radiation (visible near infrared) at lower temperatures.

The plurality of carbon materials 148 may include a variety of currently known carbon materials (e.g., those with carbon atoms) or materials/composites not yet discovered. For example, the plurality of carbon materials 148 may be graphene, hybridized carbon such as $sp^3$, combinations thereof, and/or the like. As such, the plurality of carbon materials 148 shape or structure may be diverse and for example, may include fluorescent carbon quantum dots (CQDs), Fullerenes, nano-onions, nanodots, nanodiamonds, nanohorns, nanotubes, and/or the like. It should be understood that this is non-limiting and that the shape or structure of the plurality of carbon materials 148 may be some shape other than fluorescent carbon quantum dots (CQDs), Fullerenes, nano-onions, nanodots, nanodiamonds, nanohorns, and nanotubes. Further, the plurality of carbon materials 148 may include more than one shape or structure. That is the shape of structures of the plurality of carbon materials 148 may be a combination of fluorescent carbon quantum dots (CQDs), Fullerenes, nano-onions, nanodots, nanodiamonds, nanohorns, nanotubes, and/or the like.

Further, the hydrogel of the first hydrogel layer 145 may be based on a natural polymer such as those that include macromolecules extracted from animal collagen, plants, seaweed, and/or the like. As is known, the natural macromolecules are generally polysaccharides and proteins comprised of glycosidic and amino acid repeating units, respectively. Hydrogels are generally made of macromolecules, such as chains of polymers, polysaccharides, proteins, and/or the like, and may be based on non-covalent interactions between small molecule building blocks or covalent interactions. As such, hydrogels are known as a soft material that retains large levels of liquids, such as water, due to the cross-linking of polymer chains. The hydrogel of the first hydrogel layer 145 may include a variety of hydrogel materials, such as homopolymer, copolymer, semi-interpenetrating network, interpenetrating network, and/or the like.

Still referring to FIGS. 2 and 3A-3B, the second hydrogel layer 150 is a layer of hydrogel that includes an interior surface 152a and an opposite exterior surface 152b. The exterior surface 152b is spaced apart from the interior surface 152a to define a thickness. The interior surface 152a is in contact with the outer surface 147b of the first hydrogel layer 145. The second hydrogel layer 150 may include a poly N-isopropyl acrylamide (PNIPAM) hydrogel 154 with thermochromic properties caused from the addition of various chemicals. For example, and without limitation, sodium dodecyl sulfate (SDS) micelles into a crosslinked copolymer of hydrophilic acrylamide and hydrophobic stearyl methacrylate ($C_{18}$).

The thermochromic PNIPAM hydrogel 154, which is different from the hydrogel of the first hydrogel layer 145, has a reversible phase transition at a Lower Critical Solution Temperature (LCST) that changes visible and/or near infrared reflectivity. That is, the LCST may be tunable. For example, the LCST may be between 34° C. and 37° C. for the thermochromic PNIPAM hydrogel 154. As such, when the thermochromic PNIPAM hydrogel of the second hydrogel layer 150 is below the LCST, the thermochromic PNIPAM hydrogel 154 may change visible and/or near infrared reflectivity compared to the visible and/or near infrared reflectivity of the thermochromic PNIPAM hydrogel 154 above the LCST.

As such, in the solar reflective state, the thermochromic PNIPAM hydrogel 154 of the second hydrogel layer 150 will reflect the solar radiation, depicted by arrow 120, as best illustrated in FIG. 3A. This continues until the temperature of the thermochromic PNIPAM hydrogel 154 of the second hydrogel layer 150 is at or below the LCST, in which the thermochromic PNIPAM hydrogel 154 of the second hydrogel layer 150 changes visible and/or near infrared reflectivity permitting the solar radiation, illustrated by arrow 120, to pass through the thermochromic PNIPAM hydrogel 154, as best illustrated in FIG. 3B.

As such, it should be understood that a temperature threshold of the example passive thermal regulation system 100 may correspond to the LCST of the thermochromic PNIPAM hydrogel 154 of the second hydrogel layer 150. As such, when a temperature of the of the thermochromic PNIPAM hydrogel 154 of the second hydrogel layer 150 is below the LCST, the coating 115 may be in the solar absorber state, illustrated in FIG. 3B and when the temperature of the of the thermochromic PNIPAM hydrogel 154 of the second hydrogel layer 150 is above the LCST the coating 115 may be in the solar reflective state, illustrated in FIG. 3A.

Still referring to FIGS. 2 and 3A-3B, the cover 155 may be a layer that includes an internal surface 157a and an opposite external surface 157b. The external surface 157b is spaced apart from the internal surface 157a to define a thickness. The internal surface 157a is in contact with the exterior surface 152b of the second hydrogel layer 150. The cover 155 may be transparent and is positioned such that the substrate 110 and the cover 155 sandwich the porous layer 140, the first hydrogel layer 145, and the second hydrogel layer 150 to prevent liquids within the layers, such as water, from evaporation.

In some embodiments, the cover 155 may be formed from a polyethylene (PE) material. In other embodiments, the cover 155 may be formed from polypropylene, nylon, acrylic or polymethyl methacrylate (PMMA), polycarbonate (PC), and/or the like. As such, the cover 155 may be formed from various materials that are transparent.

Referring now to FIG. 2, the thicknesses of the device 105 in the device vertical direction (i.e., in the +/−Z direction) may generally be at least 2.5 mm. This is non-limiting, and the device 105 may have a thickness that is less than 2.5 mm. Further, the specifics of each thickness of the various layers of the device 105 (e.g., the substrate 110, the porous layer 140, the first hydrogel layer 145, the second hydrogel layer 150, and the cover 155) while depicted with particular thicknesses is non-limiting, and each layer of the device 105 (e.g., the substrate 110, the porous layer 140, the first hydrogel layer 145, the second hydrogel layer 150, and the cover 155) may be larger or smaller than the thickness depicted in FIG. 2.

For example, the depiction that the combination of the substrate 110 and the porous layer 140 is between 1 mm and 2 mm is non-limiting and the thickness of the combination of the substrate 110 and the porous layer 140 may be less than 1 mm or greater than 2 mm. The depiction that the combination of the second hydrogel layer 150 and the cover 155 is between 1 mm and 2 mm is non-limiting and the thickness of the combination of the second hydrogel layer 150 and the cover 155 may be less than 1 mm or greater than 2 mm. Additionally, while the thickness of the combination of the substrate 110 and the porous layer 140 and the combination of the second hydrogel layer 150 and the cover 155 is depicted as being uniform (i.e., the same thickness), this is non-limiting. The thickness of the combination of the substrate 110 and the porous layer 140 may be greater than the thickness of the combination of the second hydrogel layer 150 and the cover 155, or vice versa.

Further, the thickness of the first hydrogel layer 145, while illustrated as less than the thickness of the combination of the substrate 110 and the porous layer 140 and the thickness of the combination of the second hydrogel layer 150 and the cover 155 is non-limiting. The thickness of the first hydrogel layer 145 may be less than one or both of the thickness of the combination of the substrate 110 and the porous layer 140 and the thickness of the combination of the second hydrogel layer 150 and the cover 155. Further, the thickness of the first hydrogel layer 145 may be less than or greater than 0.5 mm.

Now referring to FIGS. 3A-3B, in operation, when the coating 115 is in the solar reflective state, the thermochromic PNIPAM hydrogel 154 of the second hydrogel layer 150 inhibits the solar radiation derived from outside of the device 105, depicted by arrow 120, from entering the hydrogel system 144, as best illustrated in FIG. 3A. Alternatively, when the coating 115 is in the solar absorber state, the hydrogel system 144 permits the solar radiation derived from outside of the device 105 into the device 105, as best illustrated in FIG. 3B. In particular, in the solar absorber state, the thermochromic PNIPAM hydrogel 154 of the second hydrogel layer 150 may become transparent and the plurality of carbon materials 148 positioned within the first hydrogel layer 145 absorb the solar radiation derived from outside of the device 105.

Further, a liquid communication between the porous layer 140 and the hydrogel system 144 will now be discussed in greater detail. As discussed in detail above, one of the properties of hydrogel is water retention. Further, as discussed above, the plurality of porous materials 143, such as sponge materials, positioned between the outer-face 142a and the interface 142b of the porous layer 140 act as the liquid reservoir when the coating 115 is in the solar reflective state, as best illustrated in FIG. 3A, and as the fluid source when the coating 115 is in the solar absorber state, as best illustrated in FIG. 3B.

In operation, when the coating 115 of the device 105 is in the solar absorber state, the second hydrogel layer 150 of the hydrogel system 144 absorbs a liquid held within the plurality of porous materials 143 of the porous layer 140, depicted by arrow 160, and best illustrated in FIG. 3B. That is, the liquid 160 is drawn from the plurality of porous materials 143 of the porous layer 140, through the first hydrogel layer 145 and into the second hydrogel layer 150. As such, it should be appreciated that the plurality of porous materials 143 of the porous layer 140 act as a fluid source and the thermochromic PNIPAM hydrogel 154 of the second hydrogel layer 150 act as a fluid reservoir when the coating 115 is in the solar absorber state. Further, it should be understood that the plurality of carbon materials 148 of the first hydrogel layer 145 have little to no impact in the bidirectional movement of the liquid 160 between the porous layer 140 and the second hydrogel layer 150.

When the coating 115 of the device 105 is in the solar reflective state, the second hydrogel layer 150 releases the liquid 160 that has been collected by the thermochromic PNIPAM hydrogel 154 of the second hydrogel layer 150. The liquid 160 is captured by the plurality of porous materials 143 of the porous layer 140, as best illustrated in FIG. 3A. That is, the movement of the liquid 160 in the solar reflective state is opposite, or inverse, to the movement of the liquid 160 in the solar absorber state.

Figure 4:
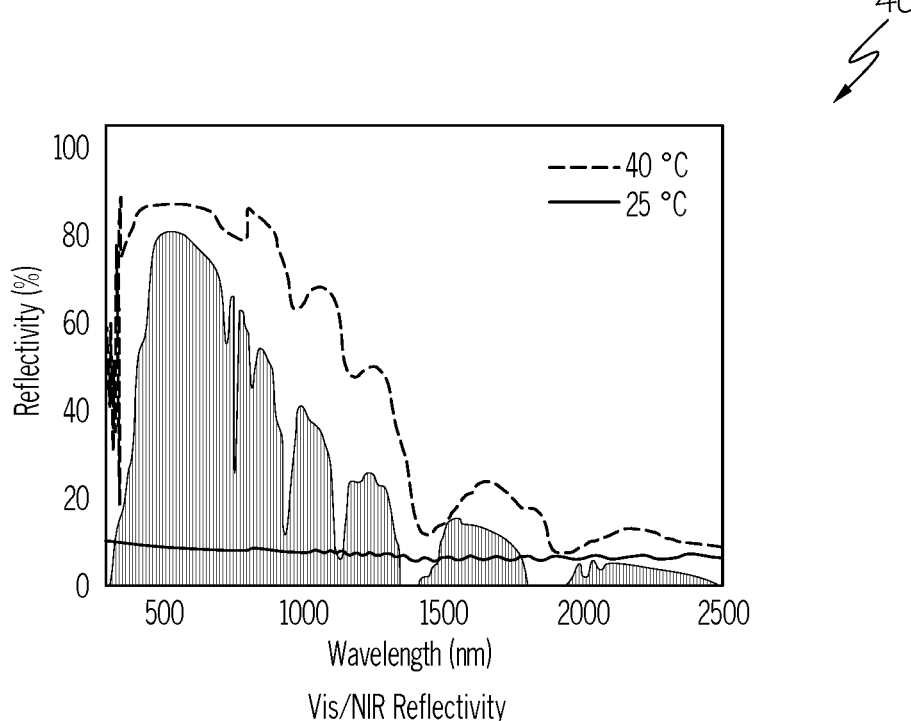
FIG. 4 schematically depicts a graphical representation of a visible and/or near infrared reflectivity of the example passive thermal regulation system of FIG. 1A in the solar reflective state.

Now referring to FIG. 4, a graphical representation 400 of an ultraviolet-visible illustrating a reflectively percentage versus wavelength (nm) as a function of temperature. The graph illustrates that in testing the reflectivity of PNIPAM hydrogels increase as the temperature increases from 25° C. to 40° C. As such, the PNIPAM hydrogel has the capability to control the incident solar irradiation at different temperatures, such as absorbing a solar heat at low temperature and reflecting the solar heat at high temperature.

Figure 5:
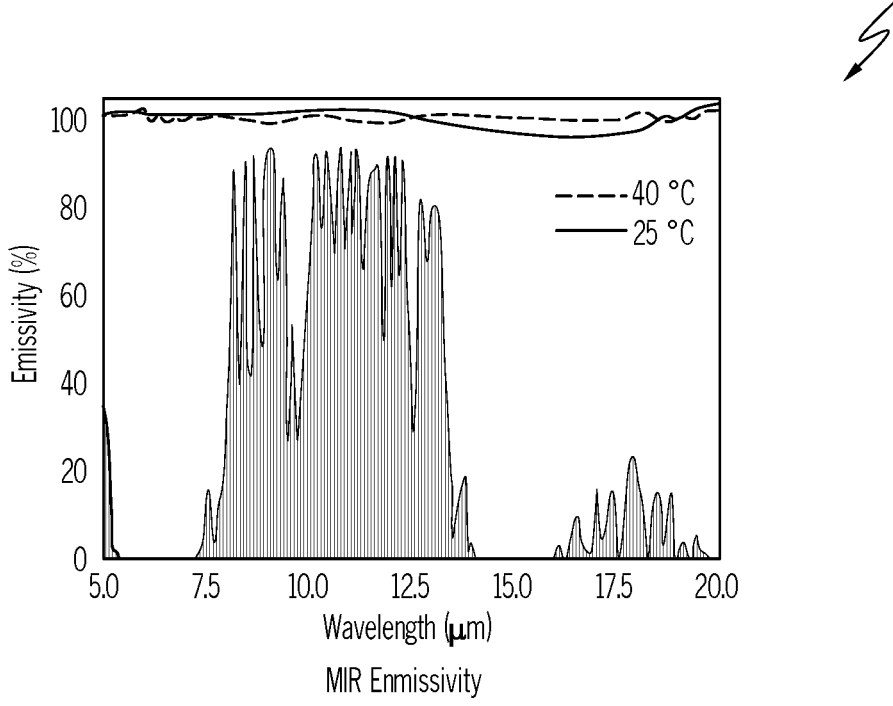
FIG. 5 schematically depicts a graphical representation of a MIR Emissivity of the example passive thermal regulation system of FIG. 1A in the solar absorber state according to one or more embodiments shown and described herein.

Now referring to FIG. 5, a graphical representation 500 of MIR Emissivity illustrating the infrared emissivity percentage versus the wavelength (μm) as a function of temperature. The graph illustrates that in testing the infrared emissivity indicates that the PNIPAM hydrogel presents a high emissivity (e.g., greater than 80%) between 7.5 (μm) wavelengths and 14.0 (μm) wavelengths. As such, the PNIPAM hydrogel has a strong radiative cooling performance.

It should now be understood that the embodiments of this disclosure described herein provide a passive thermal regulation system for radiative heating and cooling that is adjustable to changing temperatures. The system utilizes a device, such as a sun absorber, that includes a substrate and a coating for passively switching the system between a solar reflective state when a temperature of the device is above a predetermined threshold, and a solar absorber state when the temperature of the device is below the predetermined threshold.

More particularly, the substrate is manipulated between the solar reflective state when the temperature of the device is above the predetermined threshold and the solar absorber state when the temperature of the device is below the predetermined threshold using a hydrogel system and a porous layer of the coating. The porous layer includes a plurality of porous materials, such as sponges, configured to act as a fluid reservoir when the coating is in the solar reflective state and a fluid source when the coating is in the solar absorber state.

The first hydrogel layer includes a plurality of carbon materials configured to absorb a solar radiation. The plurality of carbon materials permit the coating to solar radiation (visible near infrared) at lower temperatures. The second hydrogel layer includes a thermochromic PNIPAM hydrogel, which is different from the first hydrogel layer. The thermochromic PNIPAM hydrogel has a reversible phase transition at a Lower Critical Solution Temperature that changes visible and/or near infrared reflectivity.

It is noted that the term "about" and "generally" may be utilized herein to represent the inherent degree of uncertainty that may be attributed to any quantitative comparison, value, measurement, or other representation. This term is also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A passive thermal regulation system comprising:
a substrate having an upper surface and an opposite lower surface;

a coating positioned to encapsulate at least a portion of the substrate, the coating comprising:
a first hydrogel layer having a plurality of carbon materials configured to absorb a solar radiation; and
a second hydrogel layer having a hydrogel that is different from the first hydrogel layer; and
a porous layer having an outer face surface and an interface surface, the porous layer further having a plurality of porous materials configured to act as a liquid reservoir for holding a liquid, the porous layer, the first hydrogel layer, and the second hydrogel layer are arranged in a vertically stacked arrangement such that the porous layer is positioned below the first hydrogel layer in a device vertical direction whereby the outer face surface of the porous layer abuts an inner surface of the first hydrogel layer and the interface surface abuts with the upper surface of the substrate,
wherein the coating, at a first temperature, causes the passive thermal regulation system to passively switch from a solar reflective state to solar absorber state to permit the plurality of carbon materials to absorb the solar radiation, and at a second temperature, causes the passive thermal regulation system to passively switch from the solar absorber state to the solar reflective state where the hydrogel of the second hydrogel layer inhibits the solar radiation from absorption, the second temperature being greater than the first temperature and in the solar absorber state, the first hydrogel layer and second hydrogel layer absorbs the liquid held within the plurality of porous materials of the porous layer in the device vertical direction and in the solar reflective state, the porous layer receives the liquid from the first hydrogel layer and second hydrogel layer in the device vertical direction.

2. The passive thermal regulation system of claim 1, wherein in the solar absorber state, the plurality of carbon materials configured to absorb the solar radiation to heat the passive thermal regulation system.

3. The passive thermal regulation system of claim 1, wherein the solar reflective state where the hydrogel of the second hydrogel layer inhibits the solar radiation from absorption cools the passive thermal regulation system.

4. The passive thermal regulation system of claim 1, wherein the first hydrogel layer is positioned below the second hydrogel layer in a device vertical direction.

5. The passive thermal regulation system of claim 1, further comprising:
a cover positioned above the second hydrogel layer in a device vertical direction,
wherein the cover and the substrate sandwich the porous layer, the first hydrogel layer and the second hydrogel layer.

6. The passive thermal regulation system of claim 1, wherein at the first temperature, the second hydrogel layer will absorb the liquid held within the plurality of porous materials of the porous layer and, at the second temperature, the second hydrogel layer releases the liquid to be collected by the plurality of porous materials of the porous layer.

7. The passive thermal regulation system of claim 1, wherein the hydrogel of the second hydrogel layer is a thermochromic PNIPAM hydrogel.

8. A passive heating and cooling device comprising:
a substrate having an upper surface and an opposite lower surface;
a coating positioned to encapsulate at least a portion of the substrate, the coating comprising:
a first layer disposed on the substrate;

a first hydrogel layer having a plurality of carbon materials configured to absorb a solar radiation; and a second hydrogel layer comprising a thermochromic PNIPAM hydrogel; and a porous layer having an outer face surface and an interface surface, the porous layer further having a plurality of porous materials configured to act as a liquid reservoir for holding a liquid, the porous layer, the first hydrogel layer, and the second hydrogel layer are arranged in a vertically stacked arrangement such that the porous layer is positioned below the first hydrogel layer in a device vertical direction whereby the outer face surface of the porous layer abuts an inner surface of the first hydrogel layer and the interface surface abuts with the upper surface of the substrate, wherein the coating, at a first temperature, causes the passive heating and cooling device to passively switch from a solar reflective state to solar absorber state to permit the plurality of carbon materials to absorb the solar radiation, and at a second temperature, causes the passive heating and cooling device to passively switch from the solar absorber state to the solar reflective state where the thermochromic PNIPAM hydrogel of the second hydrogel layer inhibits the solar radiation from absorption, the second temperature being greater than the first temperature and wherein in the solar absorber state, the first hydrogel layer and the second hydrogel layer absorbs the liquid held within the plurality of porous materials of the porous layer in the device vertical direction and in the solar reflective state, the porous layer receives the liquid from the first hydrogel layer and second hydrogel layer in the device vertical direction.

9. The passive heating and cooling device of claim 8, wherein in the solar absorber state, the plurality of carbon materials configured to absorb the solar radiation to heat the passive heating and cooling device.

10. The passive heating and cooling device of claim 8, wherein the solar reflective state where the thermochromic PNIPAM hydrogel of the second hydrogel layer inhibits the solar radiation from absorption cools the passive heating and cooling device.

11. The passive heating and cooling device of claim 8, wherein the first hydrogel layer is positioned below the second hydrogel layer in a device vertical direction.

12. The passive heating and cooling device of claim 8, further comprising:

a cover positioned above the second hydrogel layer in the device vertical direction, wherein the cover and the substrate sandwich the porous layer, the first hydrogel layer and the second hydrogel layer.

13. The passive heating and cooling device of claim 8, wherein at the first temperature, the second hydrogel layer will absorb the liquid held within the plurality of porous materials of the porous layer and, at the second temperature, the second hydrogel layer releases the liquid to be collected by the plurality of porous materials of the porous layer.

14. A passive thermal regulation system comprising:

a substrate having an upper surface and an opposite lower surface;

a coating positioned to encapsulate at least a portion of the substrate, the coating comprising:

a porous layer having an outer face surface and an interface surface, the porous layer comprising a plurality of porous materials configured to act as a liquid reservoir for holding a liquid;

a first hydrogel layer comprising a plurality of carbon materials configured to absorb a solar radiation; and a second hydrogel layer comprising a thermochromic PNIPAM hydrogel, the porous layer, the first hydrogel layer, and the second hydrogel layer are arranged in a vertically stacked arrangement such that the porous layer positioned below the first hydrogel layer in a device vertical direction whereby the outer face surface of the porous layer abuts an inner surface of the first hydrogel layer and the interface surface abuts with the upper surface of the substrate, the coating, at a first temperature, causes the passive thermal regulation system to passively switch from a solar reflective state to solar absorber state to permit the plurality of carbon materials to absorb the solar radiation and where the second hydrogel layer will absorb the liquid held within the plurality of porous materials of the porous layer, and at a second temperature, causes the passive thermal regulation system to passively switch from the solar absorber state to the solar reflective state where the thermochromic PNIPAM hydrogel of the second hydrogel layer inhibits the solar radiation from absorption and the first hydrogel layer and the second hydrogel layer each releases the liquid in the device vertical direction to be collected by the plurality of porous materials of the porous layer, the second temperature being greater than the first temperature and wherein in the solar absorber state, the first hydrogel layer and the second hydrogel layer absorbs the liquid held within the plurality of porous materials of the porous layer in the device vertical direction.

15. The passive thermal regulation system of claim 14, wherein in the solar absorber state, the plurality of carbon materials configured to absorb the solar radiation to heat the passive thermal regulation system.

16. The passive thermal regulation system of claim 14, wherein the solar reflective state where the thermochromic PNIPAM hydrogel of the second hydrogel layer inhibits the solar radiation from absorption cools the passive thermal regulation system.

* * * * *